(12) United States Patent
Liu et al.

(10) Patent No.: US 11,493,828 B2
(45) Date of Patent: Nov. 8, 2022

(54) RANGE FINDER

(71) Applicants: Sintai Optical (Shenzhen) Co., Ltd., ShenZhen (CN); Asia Optical Co., Inc., Taichung (TW)

(72) Inventors: Hua-Tang Liu, Taichung (TW); Sheng Luo, ShenZhen (CN); Chin-Hsiang Wang, Taichung (TW); Lian Zhao, ShenZhen (CN); Bin Liu, ShenZhen (CN)

(73) Assignees: SINTAI OPTICAL (SHENZHEN) CO., LTD., Shenzhen (CN); ASIA OPTICAL CO., LTD., Taichung (TW)

( * ) Notice: Subject to any disclaimer, the term of this patent is extended or adjusted under 35 U.S.C. 154(b) by 456 days.

(21) Appl. No.: 16/846,592

(22) Filed: Apr. 13, 2020

(65) Prior Publication Data

US 2020/0341349 A1    Oct. 29, 2020

(30) Foreign Application Priority Data

Apr. 24, 2019  (CN) .......................... 201910335349.3

(51) Int. Cl.
*G03B 13/20* (2021.01)
*G03B 13/36* (2021.01)
*G02B 5/04* (2006.01)

(52) U.S. Cl.
CPC ............. *G03B 13/20* (2013.01); *G02B 5/045* (2013.01); *G03B 13/36* (2013.01)

(58) Field of Classification Search
CPC ......... G03B 13/20; G03B 13/36; G02B 5/045
See application file for complete search history.

(56) References Cited

U.S. PATENT DOCUMENTS

| 9,074,878 B2 | 7/2015 | Steffey et al. |
| 9,791,272 B2 | 10/2017 | Hinderling et al. |
| 11,314,147 B1* | 4/2022 | Sharma ............... H04N 5/2253 |
| 2004/0184023 A1* | 9/2004 | Kao ........................ G01C 3/08 |
| | | 356/4.01 |

(Continued)

FOREIGN PATENT DOCUMENTS

| EP | 2789972 B1 | 8/2017 |
| TW | I270655 B | 4/2007 |
| TW | I588440 B | 2/2016 |

*Primary Examiner* — Clayton E. LaBalle
*Assistant Examiner* — Diana Hancock
(74) *Attorney, Agent, or Firm* — McClure, Qualey & Rodack, LLP

(57) ABSTRACT

A range finder includes a prism module and a prism adjusting mechanism. The prism module includes a fixing prism group and a movable prism group, wherein the fixing prism group is adjacent to the movable prism group. The prism adjusting mechanism includes a first adjusting group and a second adjusting group, wherein the first adjusting group includes a first adjusting member and a second adjusting member, and the second adjusting group includes a third adjusting member. The first adjusting member or the second adjusting member is rotated to axially move so that the movable prism group is rotated with respect to the fixing prism group about a first axis, the third adjusting member is rotated to axially move so that the movable prism group is rotated with respect to the fixing prism group about a second axis, and the first axis is perpendicular to the second axis.

20 Claims, 9 Drawing Sheets

(56) References Cited

U.S. PATENT DOCUMENTS

| | | | | |
|---|---|---|---|---|
| 2008/0043347 | A1* | 2/2008 | Shimo | G03B 13/36 |
| | | | | 359/720 |
| 2015/0055116 | A1* | 2/2015 | Liu | G01S 7/481 |
| | | | | 359/836 |
| 2018/0217475 | A1* | 8/2018 | Goldenberg | G02B 27/64 |
| 2019/0049687 | A1* | 2/2019 | Bachar | G02B 13/0065 |
| 2019/0230262 | A1* | 7/2019 | Wang | G02B 7/1805 |
| 2020/0174270 | A1* | 6/2020 | Enta | G03B 5/02 |
| 2021/0148703 | A1* | 5/2021 | Ohmuro | G01C 3/32 |

\* cited by examiner

RANGE FINDER

BACKGROUND OF THE INVENTION

Field of the Invention

The invention relates to a range finder, and more particularly to a range finder having a function of optical image stabilization.

Description of the Related Art

When it comes to optical design of a range finder, an optical path of a visible light beam and an optical path of a laser beam should be both considered. The position hit by the laser beam is required to be same as the position where eyes of the user focus on, in order to obtain a correct result of measurement.

In design of optical path of conventional range finder, the optical path of the visible light beam and the optical path of the laser beam can be overlapped or not overlapped. In the conventional range finder which is not provided with an optical image stabilization module, the optical path of the visible light beam and the optical path of the laser beam usually are not overlapped. In the conventional range finder which is provided with the optical image stabilization module, the optical path of the visible light beam and the optical path of the laser beam usually are overlapped. However, each light emitter has different emission angle of the laser beam. Therefore, during assembly of the range finder, it is difficult to overlap the optical path of the visible light beam and the optical path of the laser beam by using one mechanism.

For solving the above-described question, an adjusting mechanism for a range finder of the application is provided.

BRIEF SUMMARY OF THE INVENTION

The invention provides a range finder including a prism adjusting mechanism. By operating the prism adjusting mechanism, an optical path of a visible light beam and an output optical path of a laser beam are overlapped in the range finder, so that position hit by the laser beam is same as position where eyes of the user focus on. Therefore, the problem of incorrect result of measurement is avoided.

The range finder in accordance with an embodiment of the invention includes a prism module and a prism adjusting mechanism. The prism module includes a fixing prism group and a movable prism group, wherein the fixing prism group is adjacent to the movable prism group. The prism adjusting mechanism includes a first adjusting group and a second adjusting group, wherein the first adjusting group includes a first adjusting member and a second adjusting member, an axial direction of the first adjusting member is intersected with an axial direction of the second adjusting member, and the second adjusting group includes a third adjusting member. The first adjusting member or the second adjusting member is rotated to axially move so that the movable prism group is rotated with respect to the fixing prism group about a first axis, the third adjusting member is rotated to axially move so that the movable prism group is rotated with respect to the fixing prism group about a second axis, and the first axis is perpendicular to the second axis.

In another embodiment, the fixing prism group includes a first prism and a second prism, the movable prism group includes a roof prism, the first prism is attached to the second prism and is adjacent to the roof prism.

In yet another embodiment, the prism adjusting mechanism further includes a main body and a clamping member, the main body is adjacent to the movable prism group, the clamping member is rotatably disposed on the main body and is configured to hold the movable prism group.

In another embodiment, the first adjusting member and the second adjusting member are disposed on the main body.

In yet another embodiment, the third adjusting member is disposed on the clamping member and is axially moved to rotate the clamping member about the second axis so that the movable prism group is rotated about the second axis.

In another embodiment, the prism adjusting mechanism further includes a main body and a clamping member, the main body is adjacent to the roof prism, the clamping member is rotatably disposed on the main body and is configured to hold the roof prism, In yet another embodiment, the first adjusting member and the second adjusting member are disposed on the main body.

In another embodiment, the third adjusting member is disposed on the clamping member, and the third adjusting member is axially moved to rotate the clamping member about the second axis so that the roof prism is rotated about the second axis.

In yet another embodiment, the prism adjusting mechanism further includes a protruding portion disposed in a clearance between the fixing prism group and the movable prism group so that the movable prism group is not in contact with the fixing prism group, an end point of the protruding portion is in contact with the fixing prism group and the movable prism group, and the first adjusting member or the second adjusting member is axially moved so that the movable prism group is rotated about a point at which the end point is in contact with the fixing prism group or the movable prism group.

In another embodiment, the prism adjusting mechanism further includes a fixing member having a central axis that is parallel to the second axis, the clamping member is disposed on the main body by the fixing member, an axial direction of the third adjusting member is perpendicular to the central axis, and the axial direction of the first adjusting member is perpendicular to the axial direction of the second adjusting member.

In yet another embodiment, the fixing prism group includes a first prism and a second prism, the movable prism group includes a roof prism, the first prism is attached to the second prism and is adjacent to the roof prism, the prism module further includes a prism holder, the roof prism is disposed on the prism holder, the prism holder includes a first bearing portion and a second bearing portion, the first bearing portion is disposed on a roof surface of the roof prism, the second bearing portion is connected to the first bearing portion and is disposed on a fifth surface of the roof prism, the first adjusting member is placed against the first bearing portion, and the second adjusting member is placed against the second bearing portion.

In another embodiment, the range finder further includes an objective lens module, an optical image stabilization module and an ocular lens module, wherein a first light beam emitted by an object enters the range finder through the objective lens module, passes through the optical image stabilization module, enters the first prism, is reflected a plurality of times in the first prism, leaves the first prism, enters the roof prism, is reflected a plurality of times in the roof prism, leaves the roof prism and passes through the ocular lens module.

In yet another embodiment, the range finder further includes a light emitter and a light receiver, wherein a second light beam emitted by the light emitter passes through the second prism, enters the first prism, is reflected in the first prism, leaves the first prism and sequentially passes through the optical image stabilization module and the objective lens module to reach the object, and the object reflects the second light beam to the light receiver.

In another embodiment, the first g beam is visible light, and the second light beam is invisible light.

In yet another embodiment, the range finder further includes a display module, wherein a third light beam emitted by the display module sequentially passes through the second prism and the first prism, enters the roof prism, is reflected a plurality of times in the roof prism, leaves the roof prism and passes through the ocular lens module.

In another embodiment, the third light beam has distance information.

In yet another embodiment, the range finder further includes an objective lens module, an optical image stabilization module, an ocular lens module, a light emitter and a light receiver, wherein a first light beam emitted by an object enters the range finder through the objective lens module, passes through the optical image stabilization module, enters the fixing prism group, is reflected a plurality of times in the fixing prism group, leaves the fixing prism group, enters the movable prism group, is reflected a plurality of times in the movable prism group, leaves the movable prism group and passes through the ocular lens module, a second light beam emitted by the light emitter enters the fixing prism group, is reflected in the fixing prism group, leaves the fixing prism group and sequentially passes through the optical image stabilization module and the objective lens module to reach the object, and the object reflects the second light beam to the light receiver.

In another embodiment, the range finder further includes a display module, wherein a third light beam emitted by the display module passes through the fixing prism group, enters the movable prism group, is reflected a plurality of times in the movable prism group, leaves the movable prism group and passes through the ocular lens module.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
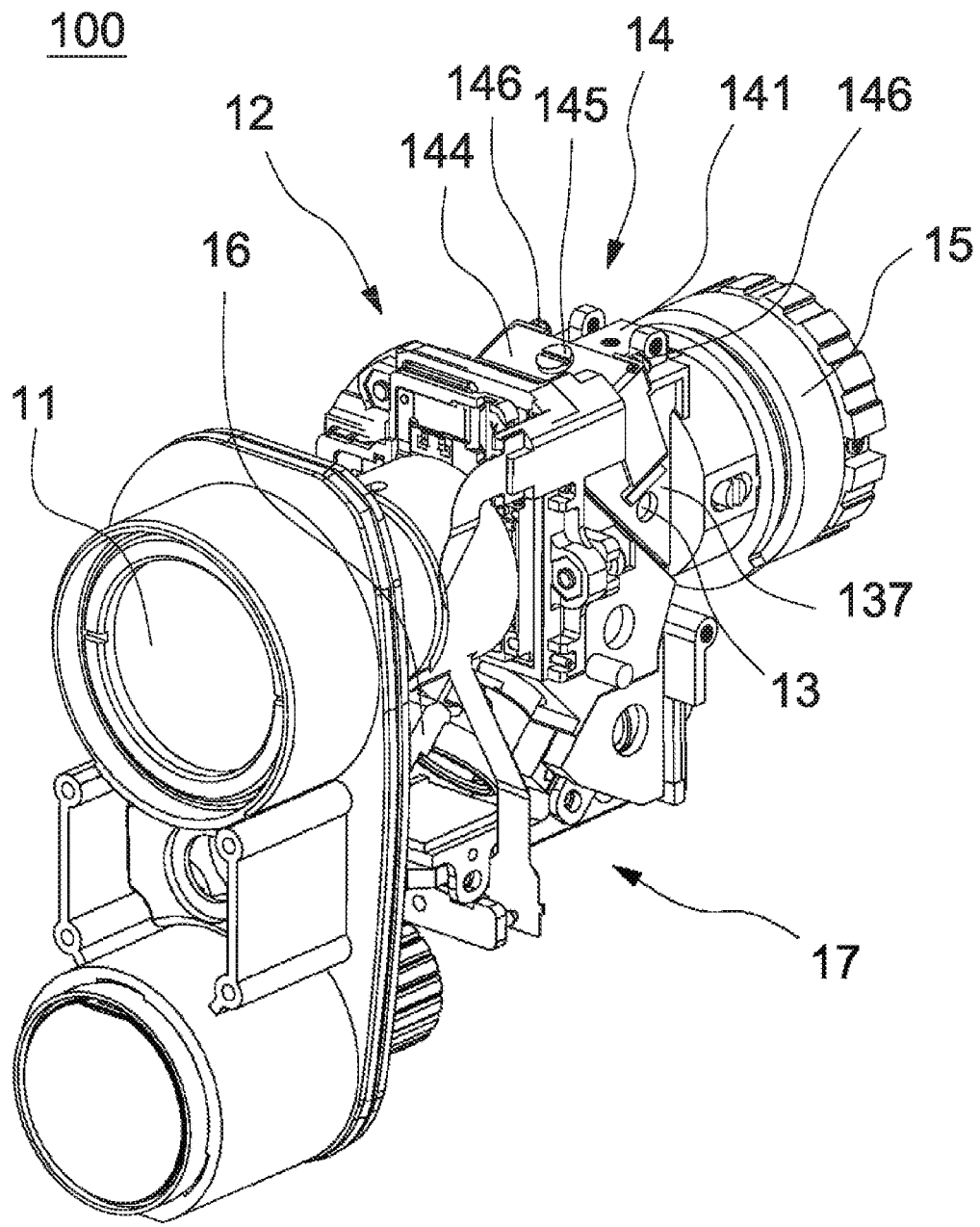
FIG. 1 is a schematic view of a range finder in accordance with an embodiment of the invention.
Figure 2:
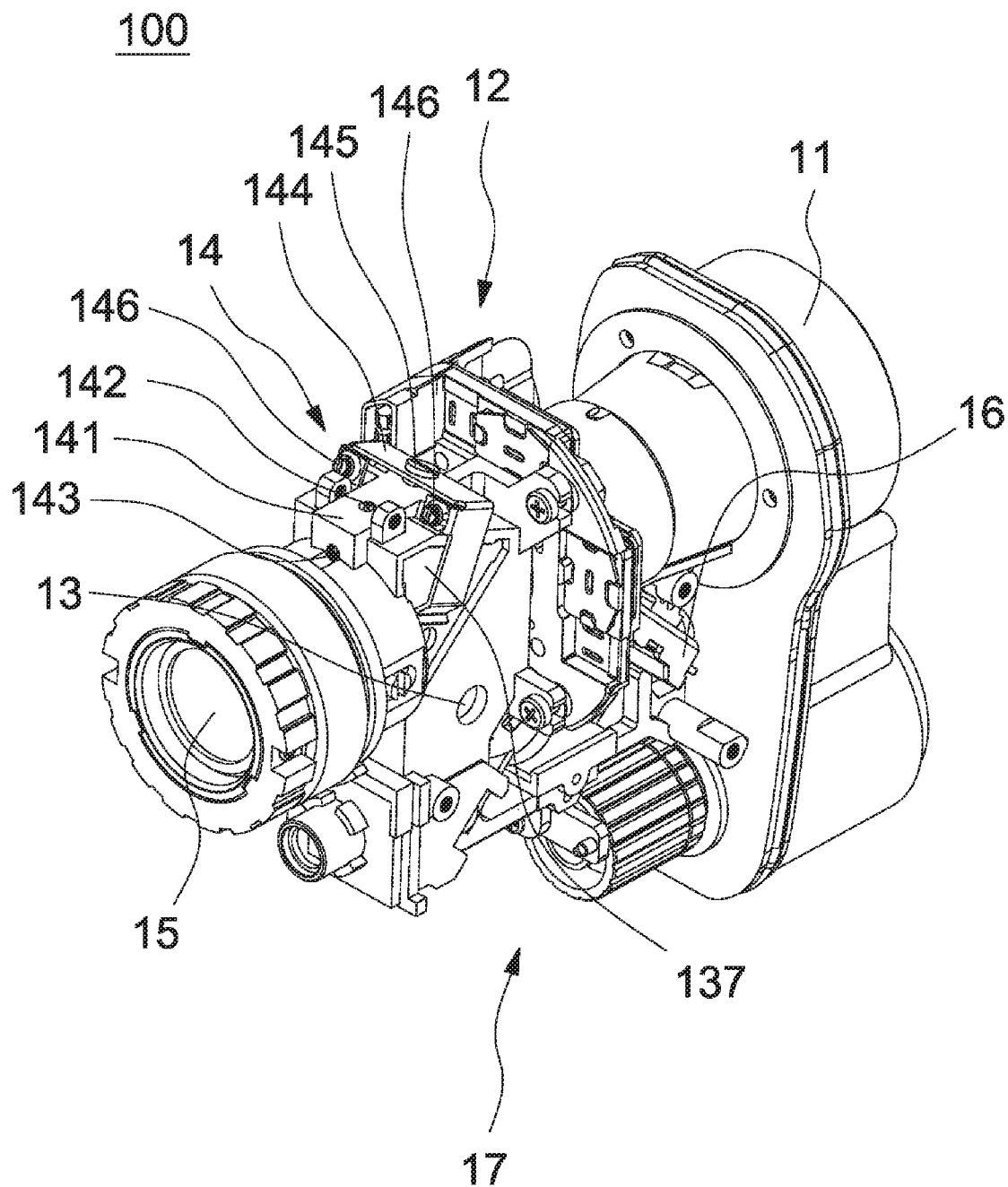
FIG. 2 is another schematic view of the range finder of FIG. 1.

Referring to FIGS. 1-2, a range finder 100 in accordance with an embodiment of the invention includes an objective lens module 11, an optical image stabilization module 12, a prism module 13, a prism adjusting mechanism 14, an ocular is module 15, a display module 16 and a transceiving module 17. The user is able to observe an object 500 (shown in FIGS. 5A and 5B) and an image (not shown) produced by the display module 16 through the objective lens module 11, the optical image stabilization module 12, the prism module 13 and the ocular lens module 15. A distance from the user to the object is obtained through the transceiving module 17. An optical path of a light beam emitted by the object and an optical path of a light beam emitted by the transceiving module 17 are overlapped in the range finder 100 by the prism adjusting mechanism 14.

Figure 3:
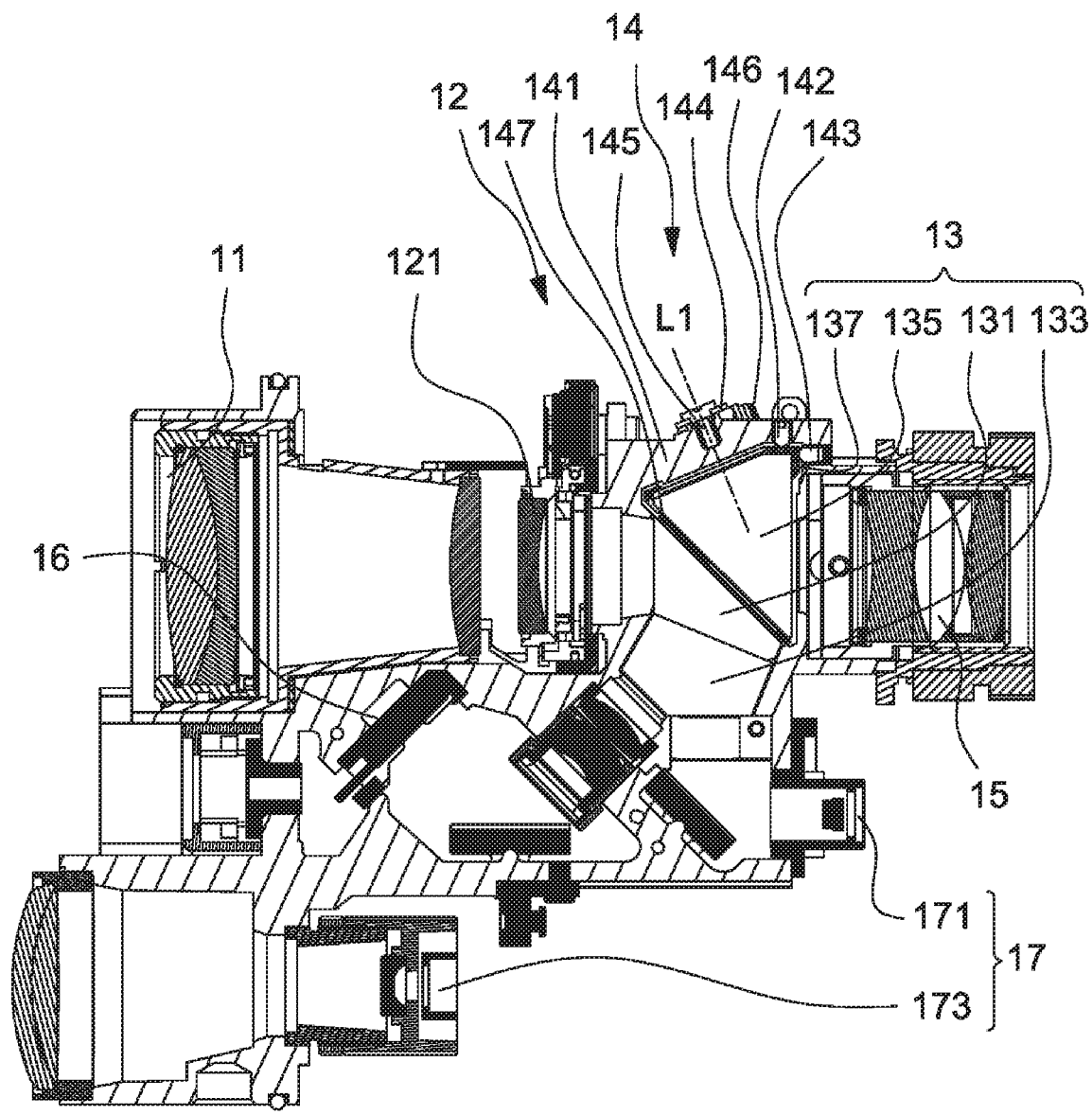
FIG. 3 is a sectional view of the range finder of FIG. 1.

Referring to FIG. 3, the optical image stabilization module 12 is disposed between the objective lens module 11 and the ocular lens module 15 and includes a movable lens 121. An amount of inclination of the range finder 100 with respect to a horizontal direction or a vertical direction can be detected by a detecting unit (not shown), and an observed image (e.g. image of the object) can be modified by moving the movable lens 121 according to the amount of inclination of the range finder 100, so as to achieve effect of image stabilization. The transceiving module 17 includes a light emitter 171 and a light receiver 173, wherein the light emitter 171 is a laser diode or a light emitting diode.

Figure 4A:
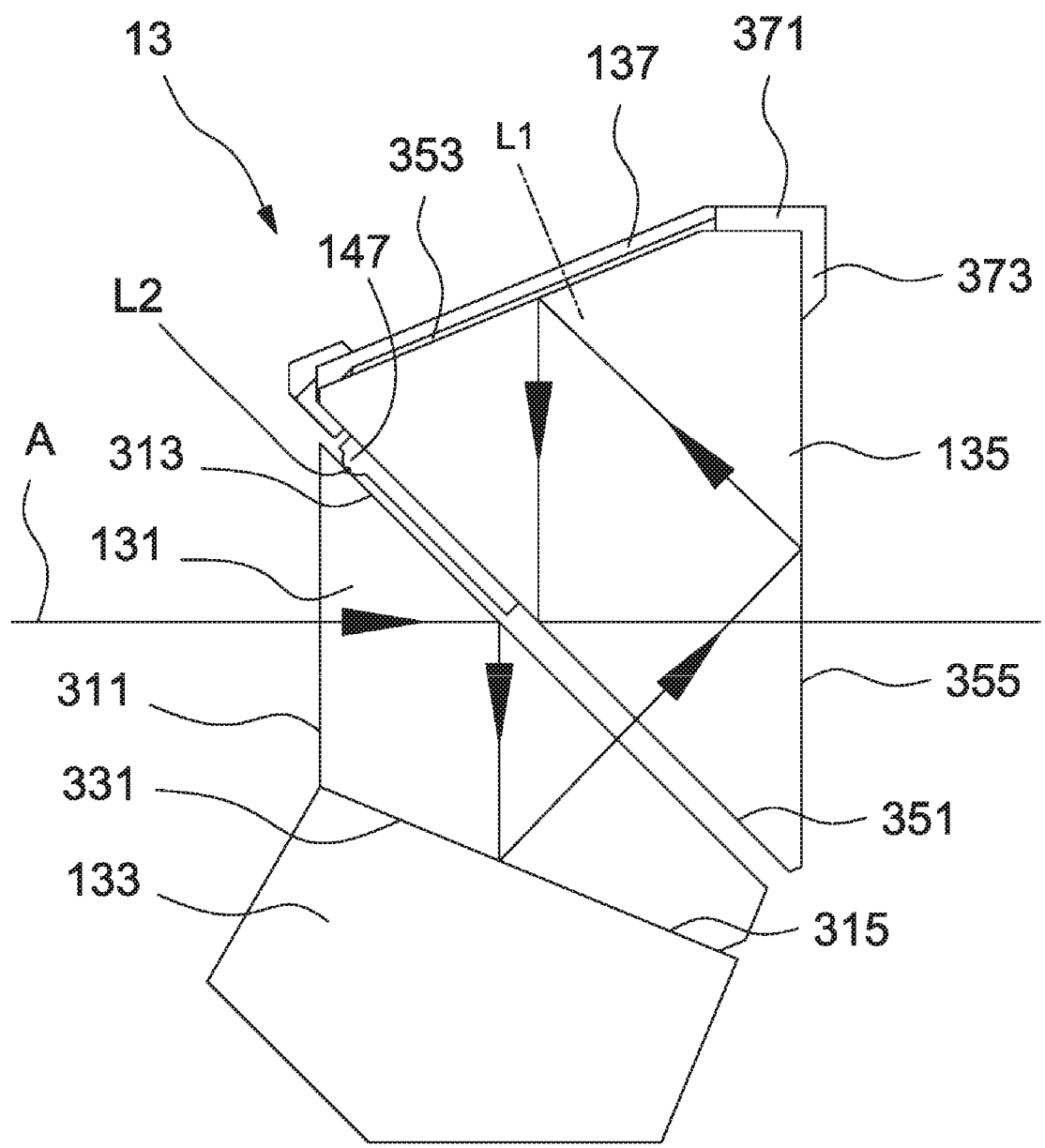
FIG. 4A depicts an optical path of a visible light beam in a prism module of FIG. 3.
Figure 4B:
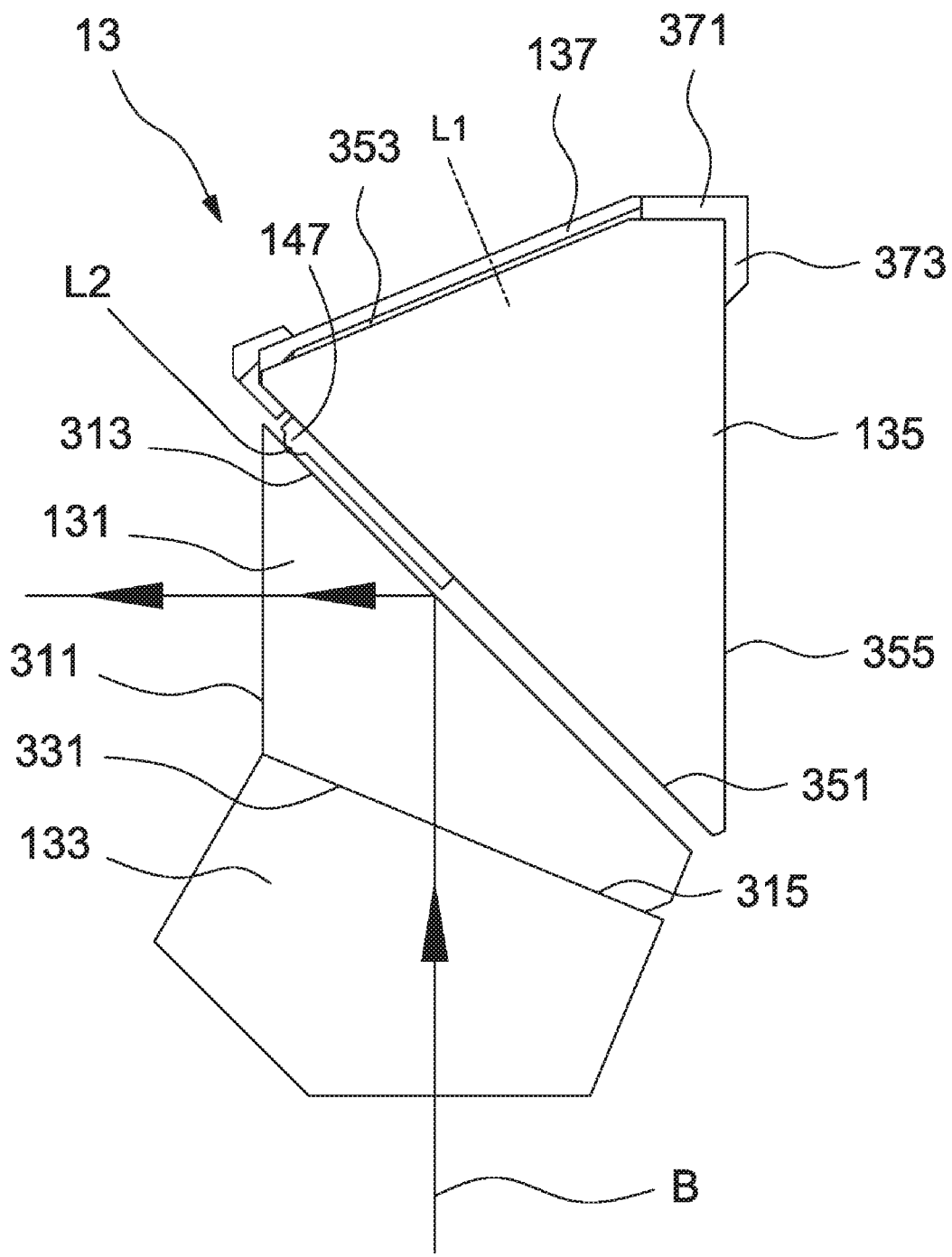
FIG. 4B depicts an optical path of an invisible light beam in the prism module of FIG. 3.
Figure 4C:
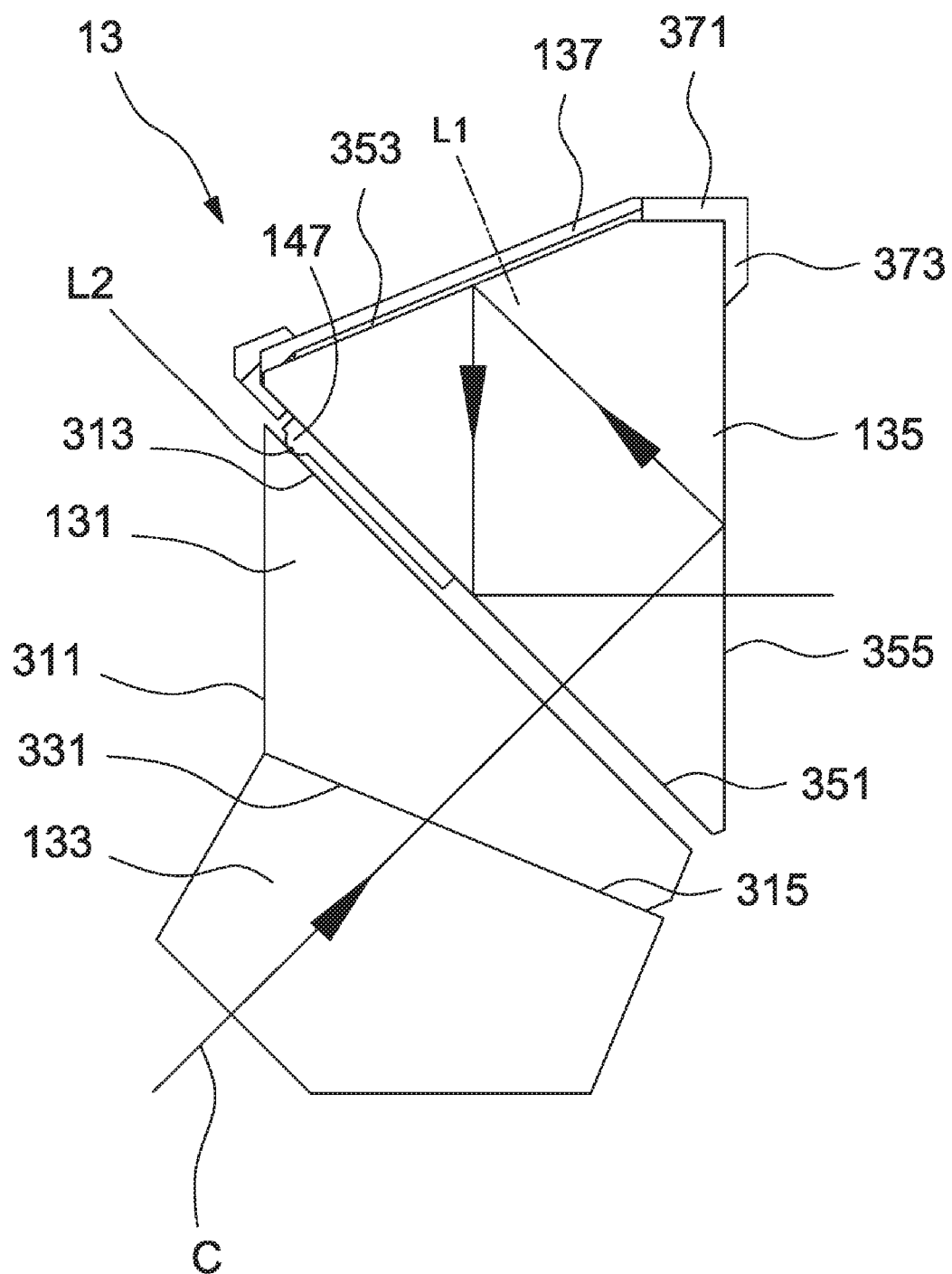
FIG. 4C depicts an optical path of an image light beam in the prism module of FIG. 3.

The prism module 13 is disposed between the optical image stabilization module 12 and the ocular lens module 15 and includes a fixing prism group, a movable prism group and a prism holder 137. The fixing prism group is adjacent to the movable prism group and includes a first prism 131 and a second prism 133, and the movable prism group includes a roof prism 135. Referring to FIGS. 4A-4C, the first prism 131 includes a first surface 311, a second surface 313 and a third surface 315, the roof prism 135 includes a fourth surface 351, a roof surface 353 and a fifth surface 355, and the second prism 133 includes a sixth surface 331. The sixth surface 331 of the second prism 133 is attached to a third surface 315 of the first prism 131, the second surface 313 is adjacent to the fourth surface 351 of the roof prism 135, and the roof prism 135 is disposed on the prism holder 137. The prism holder 137 includes a first bearing portion 371 and a second bearing portion 373, wherein the first bearing portion 371 is disposed on the roof surface 353 of the roof prism 135, and the second bearing portion 373 is connected to the first bearing portion 371 and is disposed on the fifth surface 355 of the roof prism 135.

As shown in FIGS. 1-3, the prism adjusting mechanism 14 includes a main body 141, a first adjusting group, a second adjusting group, a clamping member 144, a fixing member 145 and a protruding portion 147. The first adjusting group includes a first adjusting member 142 and a second adjusting member 143, and the second adjusting group includes two third adjusting members 146. The main body 141 is adjacent to the roof surface 353 of the roof prism 135 (as shown in FIGS. 4A-4C). The clamping member 144 is rotatably disposed on the main body 141 by the fixing member 145 and is configured to hold the prism holder 137 and the roof prism 135 of the prism module 13. The fixing member 145 has a central axis L1 that is perpendicular to the roof surface 353. The clamping member 144 can be rotated about the central axis L1 so as to rotate the roof prism 135 about the central axis L1. The third members 146 are disposed on the clamping member 144, and an axial direction of the third member 146 is perpendicular to the central axis L1 of the fixing member 145. The first adjusting member 142 is penetrated through the main body 141 and is placed against the first bearing portion 371 of the prism holder 137 (as shown in FIGS. 4A-4C). The second adjusting member 143 is also penetrated through the main body 141 and is placed against the second bearing portion 373 of the prism holder 137 (as shown in FIGS. 4A-4C). An axial direction of the first adjusting member 142 is perpendicular to an axial direction of the second adjusting member 143. That is, the axial direction of the first adjusting member 142 is intersected with the axial direction of the second adjusting member 143. The protruding portion 147 is disposed in a clearance between the second surface 313 of the first prism 131 and the fourth surface 351 of the roof prism 135 (as shown in FIGS. 4A-4C), and an end point of the protruding portion 147 is placed against the second surface 313 of the first prism 131 (as shown in FIGS. 4A-4C) so that the roof prism 135 is not in contact with the first prism 131. In present embodiment, the above described fixing member 145 and adjusting members 142, 143, 146 are bolts, nuts, screws, pins or shaft pins.

During assembly of the range finder 100, the user rotates the third adjusting members 146 to axially move the third adjusting members 146, so as to rotate the clamping member 144 about the central axis L1 of the fixing member 145. When the clamping member 144 is rotated, the roof prism 135 is rotated about the central axis L1 of the fixing member 145. Furthermore, the user rotates the first adjusting member 142 (or the second adjusting member 143) to axially move the first adjusting member 142 (or the second adjusting member 143), so as to push against the roof prism 135. When the roof prism 135 is pushed, the roof prism 135 is rotated about a point at which the end point of the protruding portion 147 is in contact with the second surface 313 of the first prism 131. In other words, the roof prism 135 is rotated about an axis L2 (in FIGS. 4A-4C, the axis L2 is only a dot due to the view angle) perpendicular to the central axis L1 of the fixing member 145.

In brief, by simply rotating the first adjusting member 142 (or the second adjusting member 143 or the third adjusting member 146 of the prism adjusting mechanism 14), the roof prism 135 is rotated with respect to the first prism 131 and the second prism 133, about the central axis L1 or the axis L2 perpendicular to the central axis L1, so that the optical path of the light beam emitted by the object 500 and the optical path of the light beam emitted by the transceiving module 17 are overlapped in the range finder 100. After the adjustment of the roof prism 135 is finished, other elements are adjusted for completing the assembly of the range finder 100.

Figure 5A:
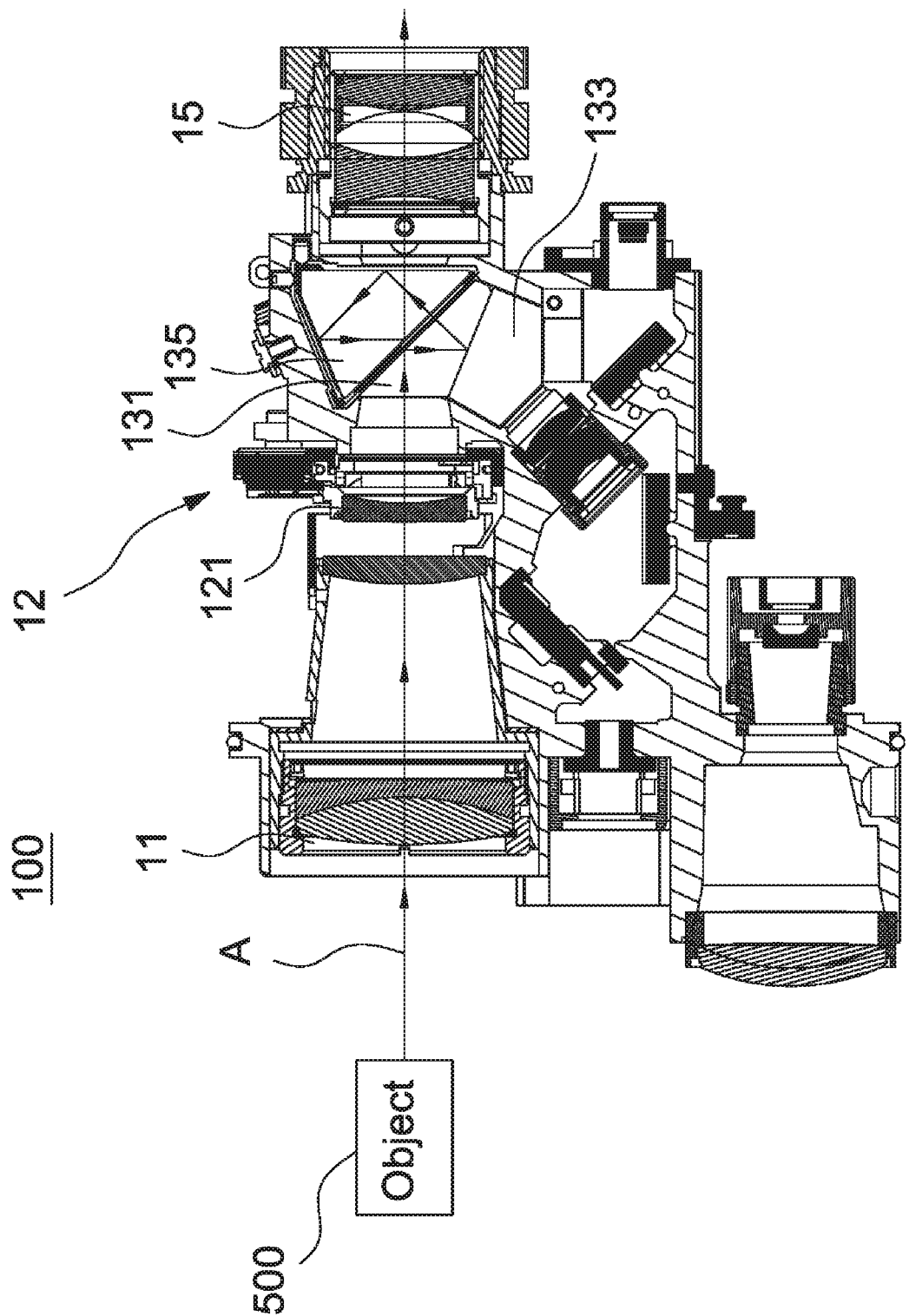
FIG. 5A depicts an optical path of the visible light beam in the range finder of FIG. 1.

Referring to FIG. 5A, during operation, the object 500 emits a visible light beam A to the range finder 100. The visible light beam A enters the range finder 100 through the objective lens module 11, passes through the optical image stabilization module 12, and enters the prism module 13. As shown in FIG. 4A, the visible light beam A enters the first prism 131 through the first surface 311, is reflected a plurality of times in the first prism 131, leaves the first prism 131 through the second surface 313, enters the roof prism 135 through the fourth surface 351, is reflected a plurality of times in the roof prism 135 and leaves the roof prism 135 through the fifth surface 355. The visible light beam A leaving the prism module 13 then passes through the ocular lens module 15 to reach the eyes of the user. In such arrangement, the user is able to observe the object 500 through the ocular lens module 15.

Figure 5B:
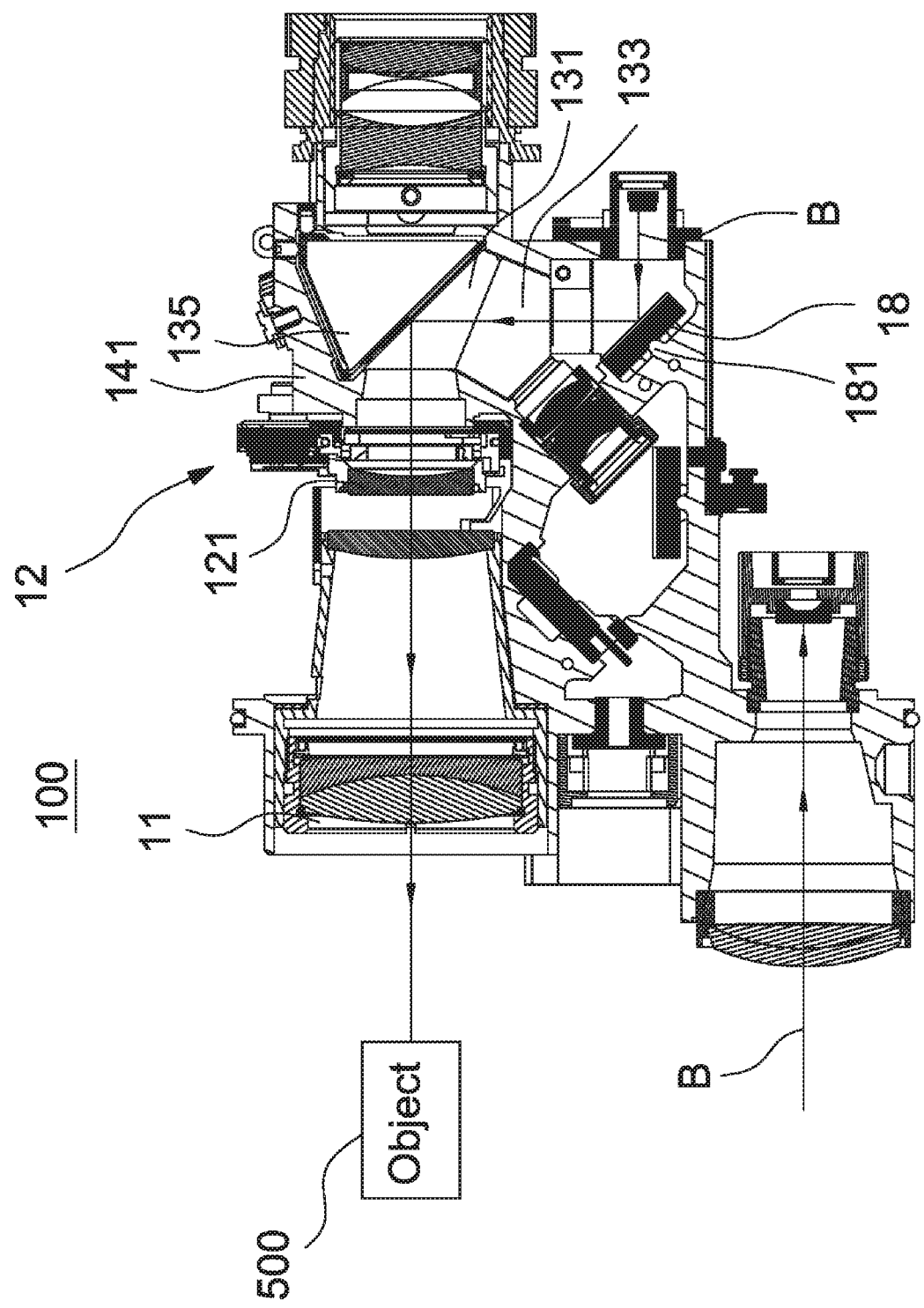
FIG. 5B depicts an optical path of the invisible light beam in the range finder of FIG. 1.

Referring to FIG. 5B, the light emitter 171 emits an invisible light beam B, and the invisible light beam B is reflected to the prism module 13 by a reflecting unit 18. In the present embodiment, a protruding portion 181 is provided between the reflecting unit 18 and the main body 141, and the reflecting unit 18 is rotatable about the protruding potion 181, so as to adjust a reflection angle of the invisible light beam B. As showy in FIG. 4B, the invisible light beam B passes through the second prism 133, enters the first prism 131 through the third surface 315, is reflected by the second surface 313 and leaves the first prism 131 through the first surface 311. The invisible light beam B leaving the prism module 13 sequentially passes through the optical image stabilization module 12 and the objective lens module 11 and leaves the range finder 100 to reach the object 500. Then, the invisible light beam B is reflected by the object 500 to the ranger finder 100 and is received by the light receiver 173. In such arrangement, the distance from the user (or the ranger finder 100) to the object 500 can be calculated.

Figure 5C:
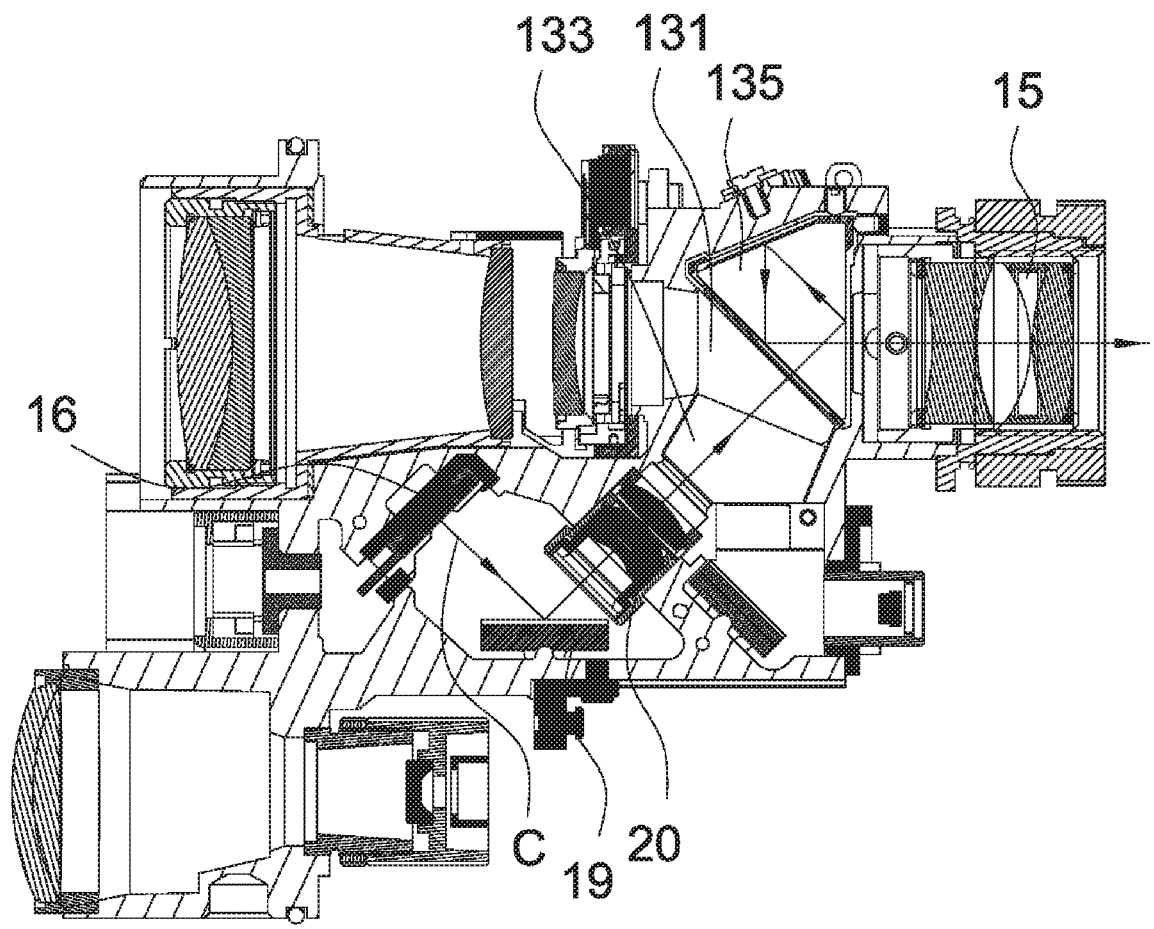
FIG. 5C depicts an optical path of the image light beam in the range finder of FIG. 1.

Referring to FIG. 5C, after the distance is obtained, the display module 16 emits an image light beam C having distance information (e.g. a numeral value of the distance) The image light beam C is reflected by a reflecting unit 19 and passes through a lens module 20 to reach the prism module 13. As shown in FIG. 4C, the image light beam C passes through the second prism 133, enters the first prism 131 through the third surface 315, leaves the first prism 131 through the second surface 313, enters the roof prism 135 through the fourth surface 351, is reflected a plurality of times in the roof prism 135 and leaves the roof prism 135 through the fifth surface 355. The image light beam C leaving the prism module 13 then passes through the ocular lens module 15 to reach the eyes of the user. In such arrangement, the user is able to know the distance from the range finder 100 to the object 500 by reading the distance information through the ocular lens module 15.

As shown in FIGS. 5A-5B, during the above-described operation, an optical path of the invisible light beam B emitted by the light emitter 171 and an optical path of the visible light beam A emitted by the object are overlapped after the invisible light beam B leaves the prism module 13. In other words, both the optical path of the invisible light beam B emitted by the light emitter 171 and the optical path of the visible light beam A emitted by the object pass through the optical image stabilization module 12 and the objective lens module 11. In such arrangement, the movement of the movable lens 121 affects both the optical path of the invisible light beam B and the optical path of the visible light beam A, so that the position in which the visible light beam A is emitted from the object (that is, the position where the eyes of the user focus on) is same as the position where the object is hit by the invisible light beam B. Therefore, the problem of incorrect result of measurement is avoided, In another embodiment, the protruding portion 147 of the prism adjusting mechanism 14 is also disposed in a clearance between the second surface 313 of the first prism 131 and the fourth surface 351 of the roof prism 135. However, an end point of the protruding portion 147 is placed against the fourth surface 351 of the roof prism 135. During operation of the prism adjusting mechanism 14 for adjusting the roof prism 135, the roof prism 135 is pushed against by the first adjusting member 142 or the second adjusting member 143 and is rotated about a point at which the end point of the protruding portion 147 is in contact with the fourth surface 351 of the roof prism 135. The arrangement of other elements and operation of this embodiment are similar to those of the embodiment described above, and therefore the descriptions thereof are omitted.

While the invention has been described by way of example and in terms of preferred embodiment, it is to be understood that the invention is not limited thereto. To the contrary, it is intended to cover various modifications and similar arrangements (as would be apparent to those skilled in the art). For example, the scope of the invention is not limited to the monocular range finder as shown in figure. That is to say, the binocular range finder is not excluded from the invention. Therefore, the scope of the appended claims should be accorded the broadest interpretation so as to encompass all such modifications and similar arrangements.

What is claimed is:

1. A range finder; comprising:
   a prism module comprising a fixing prism group and a movable prism group, wherein the fixing prism group is adjacent to the movable prism group; and
   a prism adjusting mechanism comprising a first adjusting group and a second adjusting group, wherein the first adjusting group comprises a first adjusting member and a second adjusting member, an axial direction of the first adjusting member is intersected with an axial direction of the second adjusting member, and the second adjusting group comprises a third adjusting member;
   wherein the first adjusting member or the second adjusting member is rotated to axially move so that the movable prism group is rotated with respect to the fixing prism group about a first axis, the third adjusting member is rotated to axially move so that the movable prism group is rotated with respect to the fixing prism group about a second axis, and the first axis is perpendicular to the second axis.

2. The range finder as claimed in claim 1, wherein the fixing prism group comprises a first prism and a second prism, the movable prism group comprises a roof prism, the first prism is attached to the second prism and is adjacent to the roof prism.

3. The range finder as claimed in claim 2, wherein the prism adjusting mechanism further comprises a main body and a clamping member, the main body is adjacent to the roof prism, the clamping member is rotatably disposed on the main body and is configured to hold the roof prism.

4. The range finder as claimed in claim 3, wherein the first adjusting member and the second adjusting member are disposed on the main body.

5. The range finder as claimed in claim 4, wherein the third adjusting member is disposed on the clamping member, and the third adjusting member is axially moved to rotate the clamping member about the second axis so that the roof prism is rotated about the second axis.

6. The range finder as claimed in claim 5, wherein the prism adjusting mechanism further comprises a protruding portion disposed in a clearance between the first prism and the roof prism so that the roof prism is not in contact with the first prism, an end point of the protruding portion is in contact with the first prism and the roof prism, and the first adjusting member or the second adjusting member is axially moved so that the roof prism is rotated about a point at which the end point is in contact with the first prism or the roof prism.

7. The range finder as claimed in claim 5, wherein the prism adjusting mechanism further comprises a fixing member having a central axis that is parallel to the second axis, the clamping member is disposed on the main body by the fixing member, an axial direction of the third adjusting member is perpendicular to the central axis, and the axial direction of the first adjusting member is perpendicular to the axial direction of the second adjusting member.

8. The range finder as claimed in claim 2, wherein the prism module further comprises a prism holder, the roof prism is disposed on the prism holder, the prism holder comprises a first bearing portion and a second bearing portion, the first bearing portion is disposed on a roof surface of the roof prism, the second bearing portion is connected to the first bearing portion and is disposed on a fifth surface of the roof prism, the first adjusting member is placed against the first bearing portion, and the second adjusting member is placed against the second bearing portion.

9. The range finder as claimed in claim 2, further comprising an objective lens module, an optical image stabilization module and an ocular lens module, wherein a first light beam emitted by an object enters the range finder through the objective lens module, passes through the optical image stabilization module, enters the first prism, is reflected a plurality of times in the first prism, leaves the first prism, enters the roof prism, is reflected a plurality of times in the roof prism, leaves the roof prism and passes through the ocular lens module.

10. The range finder as claimed in claim 9, further comprising a light emitter and a light receiver, wherein a second light beam emitted by the light emitter passes through the second prism, enters the first prism, is reflected in the first prism, leaves the first prism and sequentially passes through the optical image stabilization module and the objective lens module to reach the object, and the object reflects the second light beam to the light receiver.

11. The range finder as claimed in claim 10, wherein the first light beam is visible light, and the second light beam is invisible light.

12. The range finder as claimed in claim 9, further comprising a display module, wherein a third light beam emitted by the display module sequentially passes through the second prism and the first prism, enters the roof prism, is reflected a plurality of times in the roof prism, leaves the roof prism and passes through the ocular lens module.

13. The range finder as claimed in claim 12, wherein the third light beam has distance information.

14. The range finder as claimed in claim 1, wherein the prism adjusting mechanism further comprises a main body and a clamping member, the main body is adjacent to the movable prism group, the clamping member is rotatably disposed on the main body and is configured to hold the movable prism group.

15. The range finder as claimed in claim 14, wherein the first adjusting member and the second adjusting member are disposed on the main body.

16. The range finder as claimed in claim 14, wherein the third adjusting member is disposed on the clamping member and is axially moved to rotate the clamping member about the second axis so that the movable prism group is rotated about the second axis.

17. The range finder as claimed in claim 14, wherein the prism adjusting mechanism further comprises a protruding portion disposed in a clearance between the fixing prism group and the movable prism group so that the movable prism group is not in contact with the fixing prism group, an end point of the protruding portion is in contact with the fixing prism group and the movable prism group, and the first adjusting member or the second adjusting member is axially moved so that the movable prism group is rotated about a point at which the end point is in contact with the fixing prism group or the movable prism group.

18. The range finder as claimed in claim 14, wherein the prism adjusting mechanism further comprises a fixing member having a central axis that is parallel to the second axis, the clamping member is disposed on the main body by the fixing member, an axial direction of the third adjusting member is perpendicular to the central axis, and the axial direction of the first adjusting member is perpendicular to the axial direction of the second adjusting member.

19. The range finder as claimed in claim 1, further comprising an objective lens module, an optical image stabilization module, an ocular lens module, a light emitter and a light receiver, wherein a first light beam emitted by an object enters the range finder through the objective lens module, passes through the optical image stabilization module, enters the fixing prism group, is reflected a plurality of times in the fixing prism group, leaves the fixing prism group, enters the movable prism group, is reflected a plurality of times in the movable prism group, leaves the movable prism group and passes through the ocular lens module, a second light beam emitted by the light emitter enters the fixing prism group, is reflected in the fixing prism group, leaves the fixing prism group and sequentially passes through the optical image stabilization module and the objective lens module to reach the object, and the object reflects the second light beam to the light receiver.

20. The range finder as claimed in claim 19, further comprising a display module, wherein a third light beam emitted by the display module passes through the fixing prism group, enters the movable prism group, is reflected a plurality of times in the movable prism group, leaves the movable prism group and passes through the ocular lens module.

* * * * *